United States Patent [19]

Mathes

[11] Patent Number: 4,494,625
[45] Date of Patent: Jan. 22, 1985

[54] AXIAL ACOUSTIC WAVE ATTENUATOR FOR RAMJETS

[75] Inventor: H. Bernard Mathes, Ridgecrest, Calif.

[73] Assignee: The United States of America as represented by the Secretary of the Navy, Washington, D.C.

[21] Appl. No.: 518,702

[22] Filed: Jul. 29, 1983

[51] Int. Cl.³ ............................................. F02K 1/44
[52] U.S. Cl. .................................. 181/213; 181/264; 181/281; 415/119
[58] Field of Search ............... 181/213, 264, 270, 214, 181/217, 218, 219, 281; 415/119; 244/53 B; 60/270.1

[56] References Cited

U.S. PATENT DOCUMENTS 3,340,690  9/1967  Norman et al. ................ 60/270.1 X Primary Examiner—L. T. Hix
Assistant Examiner—Brian W. Brown
Attorney, Agent, or Firm—Robert F. Beers; W. Thom Skeer; Thomas W. Hennen

[57] ABSTRACT

Apparatus for attenuating upstream gas motion induced by axial acoustic waves in a ramjet engine includes a series of hollow truncated conical attenuators acting to both modify and enhance fuel-oxidizer mixing and offering negligible resistance to downstream gas motion while offering substantial resistance to upstream gas motion within the engine.

11 Claims, 7 Drawing Figures

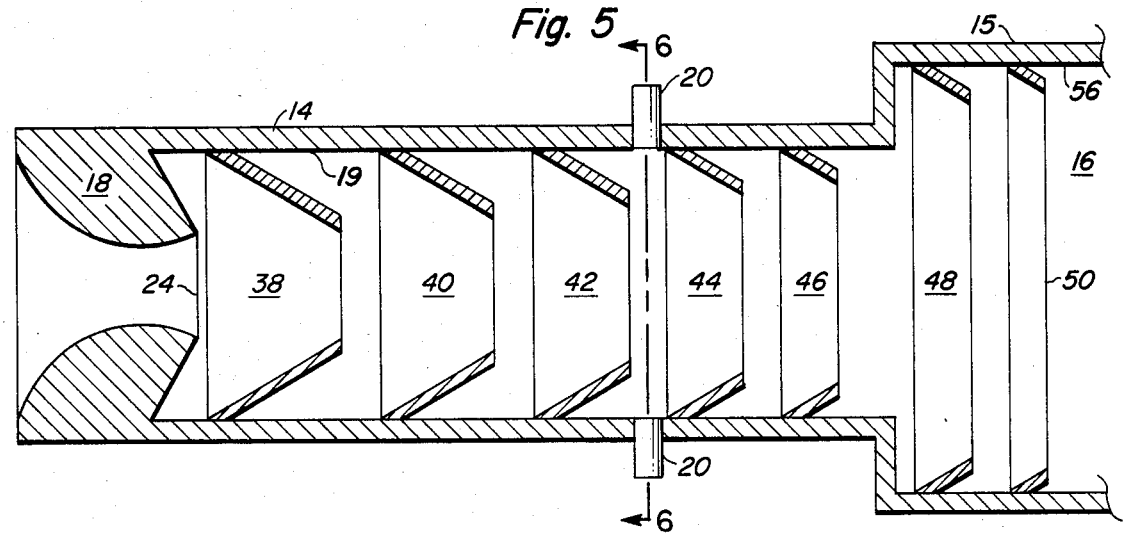
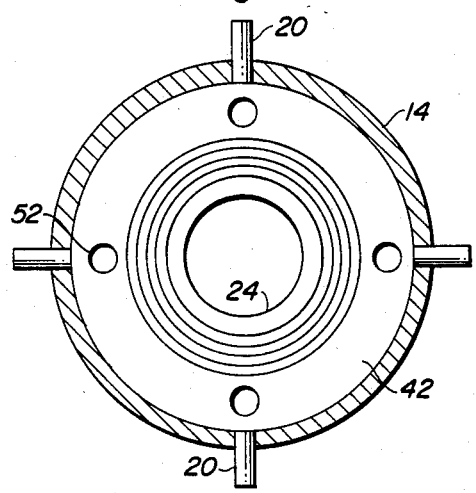
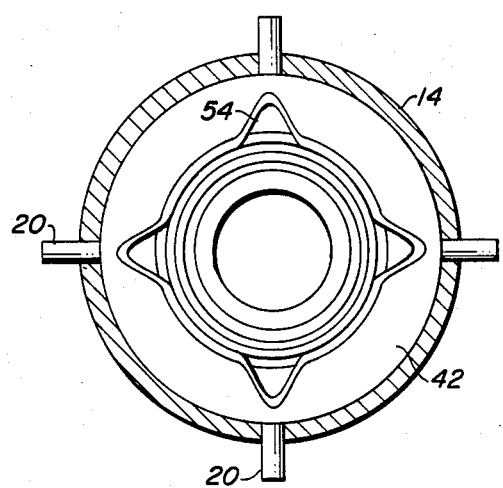

AXIAL ACOUSTIC WAVE ATTENUATOR FOR RAMJETS

BACKGROUND OF THE INVENTION

1. Field of the Invention

This invention relates to gas motion induced by axial acoustic waves in a ramjet engine and specifically to apparatus for selectively attenuating the upstream motion so induced.

2. Description of the Prior Art

Various modes of acoustic instability can occur in a ramjet engine. The acoustic waves associated with this instability derive their energy through interactions which occur between moving gases in the engine and processes ongoing in the combustion zone within the engine. A portion of the energy released by the combustion process is known to couple with and excite one or more of the acoustic wave modes of the ramjet combustor. Although mild instabilities resulting from such interaction are not critical and may in fact improve combustion efficiency by increasing fuel-oxidizer mixing, strong oscillations, which are capable of causing physical damage due to vibration or adversely affecting engine performance, are highly undesirable. Further, in a supersonic ramjet, axial mode instabilities, if sufficiently strong can create a back pressure within the engine capable of pushing the inlet shock wave out of the engines' inlet nozzle. This condition, in which combustion ceases to occur, is known as "unstart" and is similar to a "flameout" in a turbojet. However, unlike a turbojet, a ramjet is extremely difficult to restart.

Two major classes of accoustic instability have been identified in ramjets. The first class of instability is denominated transverse instability and involves wave motion normal to the axis of symmetry of the engine. The second class of instability is axial or longitudinal instability which involves wave motion parallel to the engines' axis.

Two categories of acoustic suppression devices are in wide use. The primary use of these devices, in aircraft engine applications, is in the attenuation of engine noise as it leaves the engine discharge nozzle and not in the attenuation of acoustic wave induced gas motion internal to the engine. Tuned or narrow band devices are designed to operate at a particular resonant frequency. Broadband devices, such as labyrinths, are designed to operate over a wide range of frequencies. The devices, in general, are effective in reducing transverse acoustic wave amplitudes. Attenuators for reducing axial wave amplitudes within an engine must be designed with specificity taking into account limitations imposed by engine design and performance considerations. An extremely critical factor in the design of an axial mode attenuator is its affect on the fuel injection pattern within the engine.

There had not been a uniformly acceptable solution to the problem of attenuating upstream gas motion induced by axial acoustic waves in a ramjet engine until the apparatus of the present invention was conceived and adapted for use.

SUMMARY OF THE INVENTION

The apparatus of the present invention effectively provides a directionally variable resistance to the flow of gases in a ramjet engine. When installed in the inlet section of a ramjet the apparatus of the present invention offers negligble resistance to downstream gas flow while offering significant resistance to upstream gas motions induced by axial mode instabilities within the engine. The apparatus of the present invention has an inherently broadband frequency response and thus is effective both to inhibit upstream gas flow and attenuate the axial acoustic waves causitive of upstream gas motion. Further, the apparatus of the present invention is integrable with fuel injection schemes found in typical ramjet engines and can be utilized to enhance and modify fuel-oxidizer mixing prior to combustion.

Thus, it is an object of the present invention to attenuate upstream gas motion in a ramjet engine induced by axial mode acoustic waves.

It is a further object of the present invention to provide upstream gas motion attenuation in a ramjet engine while enhancing the mixture of fuel and oxidizer within the engine prior to the occurence of combustion.

These and other objects of the invention as well as other features of the invention will be discerned from the description rendered below with reference to the accompanying drawings.

BRIEF DESCRIPTION OF THE DRAWINGS

FIG. 5 is an axial cross section of a ramjet inlet section which includes attenuators of progressively increasing throat diameter in a direction away from the inlet nozzle of the ramjet engine and demonstrates the inclusion of attenuators in the combustor section of an engine; and FIGS. 6 and 7 are views taken along lines 6—6 of FIG. 5 demonstrating the inclusion and location of circular and VEE shaped apertures respectively, in the attenuator immediately upstream of the fuel injection ports.

DESCRIPTION OF THE PREFERRED EMBODIMENT

Acoustic wave instability will exist in a ramjet engine when the acoustic gains resulting from the combustion process exceed the acoustic losses in the engine. Increased engine stability is obtained by reducing the acoustic gains and/or increasing acoustic loss within the engine. The apparatus of the present invention acts primarily to increase the acoustic loss in a ramjet engine. In addition, the apparatus, by proper choice of spacing, angle, orifice (throat) geometry, and orifice (throat) diameter can be used to control turbulence of gases flowing into the combustion chamber which acts as an acoustic gain. Therefore, the apparatus can simultaneously act as a device to reduce acoustic gains and increase acoustic losses, both actions being desirable in attaining stable engine operation.

Figure 1:
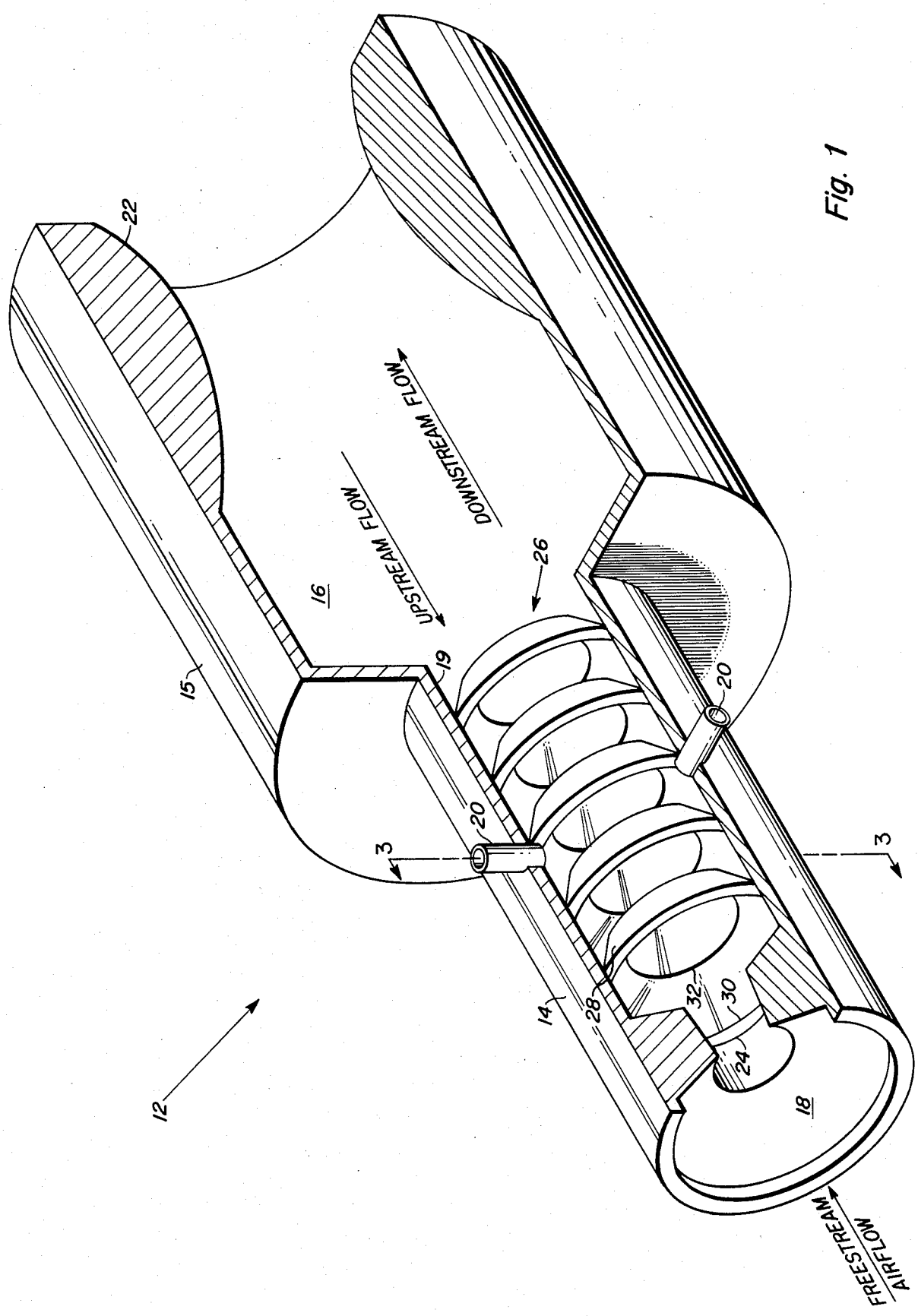
FIG. 1 is a cutaway isometric of a typical ramjet engine configuration including conical attenuators of the present invention.

FIG. 1 depicts a typical ramjet engine modified to include the apparatus of the present invention. Ramjet engine 12 consists of an inlet section 14 and combustion section 15. Inlet section 14, which is typically cylindrical in shape, includes inlet nozzle 18 and fuel injection ports 20 while combustion section 15 includes exhaust nozzle 22 and defines combustion chamber 16.

In normal operation air enters inlet nozzle 18 of inlet section 14 due to the movement of the engine through the atmosphere. This flow of air into the engine is denominated freestream airflow and is demonstrated in FIG. 1. Freestream airflow is constricted by inlet nozzle 18 causing an increase of airflow velocity and the creation of an inlet shock wave at the throat of inlet nozzle 18.

As inlet air travels through inlet section 14 toward combustion chamber 16 fuel is injected into the airstream through fuel injection ports 20. A fuel-air mixture is created and carried into combustion chamber 16 where self-sustained combustion occurs. The combustion process creates high pressure gases in combustion chamber 16 which exit the engine through exhaust nozzle 22 providing thrust. The nominal flow of air and the fuel-air mixture through the engine is indicated in FIG. 1 as downstream or mean flow direction.

Also created by the ongoing combustion in combustion chamber 16 are acoustic waves. These acoustic waves exhibit a tendency to build upon themselves and when sufficiently strong can cause vibratory damage or impart upstream motion to gases in the engine. If the acoustically induced upstream gas motion or back pressure created is unrestricted or becomes so strong as to force the inlet shock out of inlet nozzle 18 combustion in the engine will stop. Upstream flow direction within the engine is demonstrated in FIG. 1.

By the installation of a series of hollow attenuators the bases of which are oriented toward inlet nozzle 18 and the throats toward combustion chamber 16, resistance to upstream gas motion is created while mean or downstream flow is essentially unaffected. Truncated hollow cones will typically be the preferred attenuator embodiment.

FIG. 1 demonstrates the installation of a series of hollow truncated conical attenuators 26 having sloped walls 28 attached to face 19 of inlet section 14 of engine 12. Attenuators 26 are shown having indentical base diameters and identical throat diameters. Bases 30 of attenuators 26 are of a larger diameter than throats 32 and are oriented toward inlet nozzle 18 while throats 32 are oriented toward combustion chamber 16. Throats 32 of attenuators 26 are of a diameter at least as wide as the outlet diameter 24 of inlet nozzle 18 so as not to interfere with the airstream as it exits inlet nozzle 18. The relationship of the diameters of outlet diameter 24 to throats 32 is further demonstrated in FIG. 5.

Modification of the attenuator immediately upstream of fuel injection ports 20 by the addition of at least one aperture in that attenuator for each fuel injection port in inlet section 14 affords the opportunity to modify and improve the fuel injection pattern in the engine without adversely affecting the ability of the attenuator installation to resist upstream gas motion.

Figure 2:
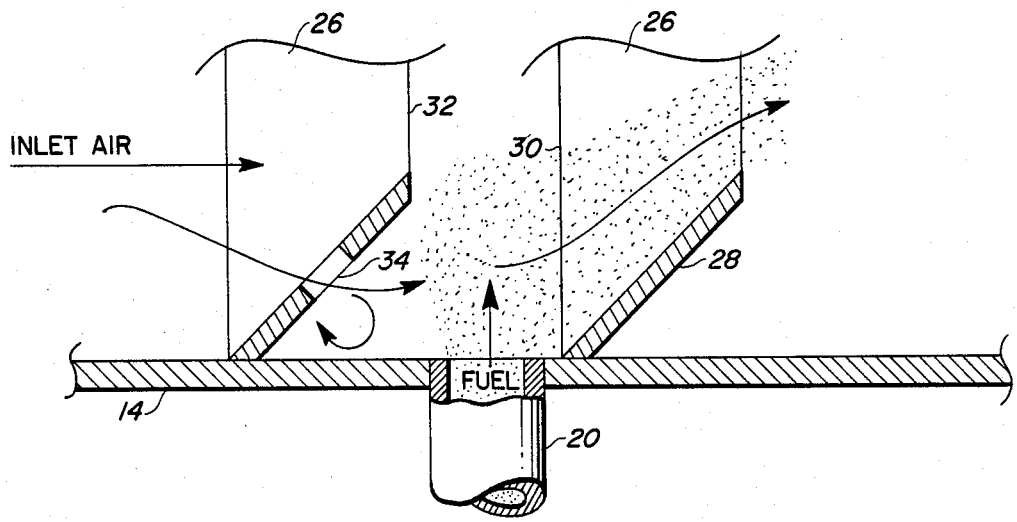
FIG. 2 is a partial cross section of a ramjet inlet section demonstrating the injection of fuel between an apertured and an unapertured attenuator.
Figure 3:
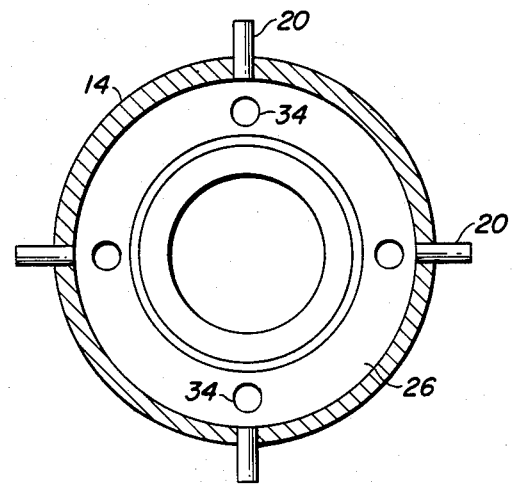
FIGS. 3 and 4 are views taken along lines 3—3 of FIG. 1 demonstrating the inclusion and location of circular and VEE shaped apertures, respectively, in the attenuator immediately upstream of the fuel injection ports.
Figure 4:
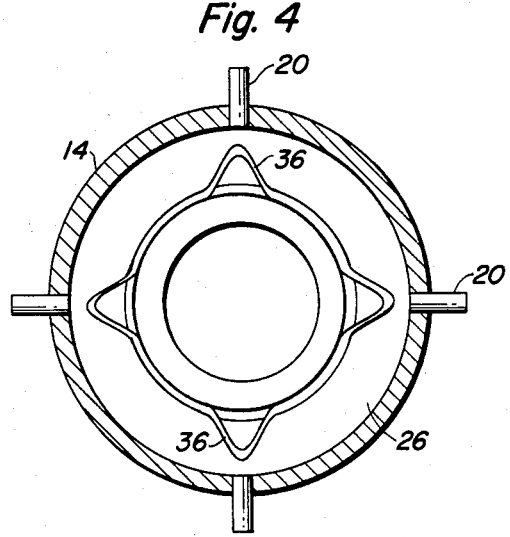

Referring now to FIGS. 2 and 3 concurrently, circular apertures 34 are located in the attenuator immediately upstream of fuel injector ports 20. Each circular aperture 34 is associated and in alignment with one fuel injection port. Circular apertures 34 create turbulence in the area in inlet section immediately adjacent to the associated fuel injection port facilitating the mixture of fuel and air at that location. The attenuator immediately downstream of the fuel injection ports may be apertured or may be unapertured, as demonstrated in the figures, depending upon the desired fuel-air mixture pattern. An unapertured downstream attenuator will deflect and direct the fuel air mixture more directly into the mainstream of airflow in inlet section 14. FIG. 4 demonstrates the utilization of VEE shaped apertures 36 in the attenuator immediately upstream of fuel injection ports 20. The shape of the apertures so utilized is dependent upon the application and intended use of a particular engine as well as the fuel-air mixture pattern sought to be achieved.

Referring now to FIG. 5, another embodiment, a series of truncated hollow conical attenuators 38, 40, 42, 44 and 46 are installed in inlet section 14 as in the embodiment of FIG. 1. However, the embodiment of FIG. 5 contemplates a series of attenuators of identical base diameter but of progressively increasing throat diameter in a direction proceeding from inlet nozzle 18 to combustion chamber 16. In this embodiment less downstream flow resistance is encountered by the inlet air as compared to the previously described embodiment while any gases induced to move upstream will encounter a series of attenuator throats of decreasing diameter. Also demonstrated in FIG. 5 is the addition of one or more attenuators attached to face 56 of combustion chamber 16 oriented similarly to the attenuators located in inlet section 14. Attenuators 48 and 50 are preferably truncated hollow cones. The inclusion of attenuators 48 and 50 for use in conjuction with attenuators located in inlet section 14 may prove advantageous in some ramjet applications or designs based upon the parameters of ramjet use. It is not inconceivable that in some particular instance the inclusion of attenuators in combustion chamber 16 independent of their installation in inlet section 14 may prove beneficial. FIGS. 6 and 7 are similar to FIGS. 3 and 4 in demonstrating the inclusion, respectively, of circular apertures 52 and vee shaped apertures 54 in attenuator 42, the attenuator immediately upstream of fuel injector ports 20 in the embodiment of FIG. 5.

The number, wall slope angle, wall thickness and spacing of the attenuators of the present invention are a function of the particular engine in which they are to be installed. In multiple inlet engines attenuators will be installed in each inlet. Attenuator installation in an engine can be accomplished in any number of ways including welding, brazing or attachment by adhesive. Sheet metal stamping is a likely form of fabrication. Stampings could be spot welded in desired locations. It may prove advantageous to machine or cast the attenuators in place in an engine inlet section. The attenuators of the present invention are preferably metallic with the material selected for use based upon its suitability for fabrication and utilization in the high temperature and vibration environment found in a ramjet engine.

It will be understood that changes and modifications may be made to the structure of the apparatus described above without departing from the spirit and scope of the invention as set forth in the claims appended hereto.

What is claimed is:

1. Attenuator apparatus installed in a ramjet engine includes a combustion section and an inlet section, the engine inlet section having an inlet nozzle and fuel injection ports and the engine combustion section having an exhaust nozzle and defining a combustion chamber, the attenuator apparatus comprising:
   a plurality of spaced apart truncated hollow cone attenuators being dimensionally identical to each other and being installed in said inlet section of said engine, each of said attenuators having a base and a throat, said base defining an area larger than the area defined by said throat, said base of each of said attenuators fixedly attached to said inlet section, said throat of each of said attenuators oriented toward the combustion chamber of said engine, and at least one of said attenuators installed in said inlet section on the side of said fuel injection ports closest to said inlet nozzle, and at least one of said attenuators installed on the side of said fuel injection ports closest to said combustion chamber of said engine, and said attenuator closest to said fuel injection ports on said inlet nozzle side of said fuel injection ports defining an aperture for each of said fuel injection ports for creating turbulence and enhancing the mixture of fuel and air adjacent the fuel injection port with which it is associated.

2. The apparatus according to claim 1 wherein each of said apertures is circular.

3. The apparatus according to claim 1 wherein each of said apertures is VEE shaped.

4. The apparatus according to claim 1 which further comprises: 'a plurality of hollow spaced apart attenuators installed in said combustion chamber of said engine, each of said attenuators having a base and a throat, said base defining an area larger than the area defined by said throat, said base of each of said attenuators fixedly attached to said combustion section and said throat of each of said attenuators oriented away from said inlet section of said engine.

5. The apparatus according to claim 4 wherein said combustion section attenuators are truncated hollow cones.

6. Attenuator apparatus installed in a ramjet engine, where the ramjet engine includes a combustion section and an inlet section, the engine inlet section having an inlet nozzle and fuel injection ports and the engine combustion section having an exhaust nozzle and defining a combustion chamber, the attenuator apparatus comprising:

a plurality of spaced apart truncated hollow cone attenuators installed in said inlet section of said engine, each of said attenuators having a base and a throat, said base defining an area larger than the area defined by said throat, said base of each of said attenuators fixedly attached to said inlet section and said throat of each of said attenuators oriented toward the combustion chamber of said engine and said throats of said attenuators being of a progressively increasing diameter in a direction away from said inlet nozzle of said inlet section.

7. The apparatus according to claim 6 wherein at least one of said cones is installed in said inlet section of the side of the fuel injection ports closest to said inlet nozzle and at least one of said cones is installed in said inlet section on the side of said fuel injection ports closest to said combustion chamber of said engine.

8. The apparatus according to claim 7 wherein the cone installed closest to said fuel injection ports on said inlet nozzle side of said fuel injection ports in said inlet section defines at least one aperture for each fuel injection port, each of said apertures for creating turbulence and enhancing the mixture of fuel and air adjacent the fuel injection port with which it is associated.

9. The apparatus according to claim 8 wherein said apertures are circular.

10. The apparatus according to claim 8 wherein said apertures are VEE shaped.

11. The apparatus according to claim 6 which further comprises:

a plurality of hollow spaced apart attenuators installed in said combustion chamber of said engine, each of said attenuators having a base and a throat, said base defining an area larger than the area defined by said throat, said base of each of said attenuators fixedly attached to said combustion section and said throat of each of said attenuators oriented away from said inlet section of said engine.

* * * * *